United States Patent [19]

Takashima et al.

[11] Patent Number: 5,325,235
[45] Date of Patent: Jun. 28, 1994

[54] COMPACT ZOOM LENS SYSTEM

[75] Inventors: Masaru Takashima; Tatsuru Kanamori, both of Tokyo, Japan

[73] Assignee: Olympus Optical Co., Ltd., Tokyo, Japan

[21] Appl. No.: 835,354

[22] Filed: Feb. 14, 1992

[30] Foreign Application Priority Data

Feb. 15, 1991 [JP] Japan ................................. 3-022218

[51] Int. Cl.$^5$ ........................ G02B 15/14; G02B 13/18
[52] U.S. Cl. ................................. 359/689; 359/715
[58] Field of Search ............................ 359/689, 715

[56] References Cited

U.S. PATENT DOCUMENTS

| | | | |
|---|---|---|---|
| 4,726,668 | 2/1988 | Nakayama et al. | 359/689 |
| 5,002,373 | 3/1991 | Yamanashi | 359/689 X |
| 5,069,536 | 12/1991 | Ogata | 359/689 |
| 5,087,988 | 2/1992 | Nakayama | 359/689 |
| 5,148,321 | 9/1992 | Goto et al. | 359/689 |

FOREIGN PATENT DOCUMENTS

| | | |
|---|---|---|
| 60-263113 | 12/1985 | Japan . |
| 61-52620 | 3/1986 | Japan . |
| 61-109012 | 5/1986 | Japan . |
| 193713 | 4/1989 | Japan . |

Primary Examiner—Scott J. Sugarman
Attorney, Agent, or Firm—Cushman, Darby & Cushman

[57] ABSTRACT

The present invention relates to a compact zoom lens system having a long back focus and a zoom ratio of about 1.7, which comprises a first lens unit G1 having a positive focal length, a second lens unit G2 having a positive focal length and a third lens unit G3 having a negative focal length, said first, second and third lens units G1, G2 and G3 being all movable toward the object side during zooming from the wide angle to telephoto side such that the first and second lens units G1 and G2 are spaced away from each other, while the second and third lens units G2 and G3 are moved toward each other, and is characterized by conforming to the following conditional formula:

$$0.34 < f_3(1-\beta_{3W})/f_W < 1.00, \quad (1)$$

and $$0.30 < f_2/f_W < 0.90, \quad (2)$$

where $f_W$ is the focal length of the total system at the wide angle end, $\beta_{3W}$ is the image-formation magnification of the third lens unit at the wide angle end, and $f_2$ and $f_3$ are the focal lengths of the second and third lens units, respectively.

21 Claims, 8 Drawing Sheets

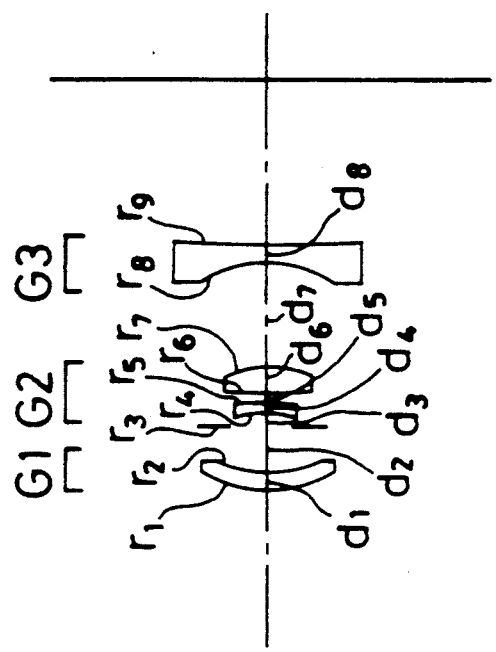
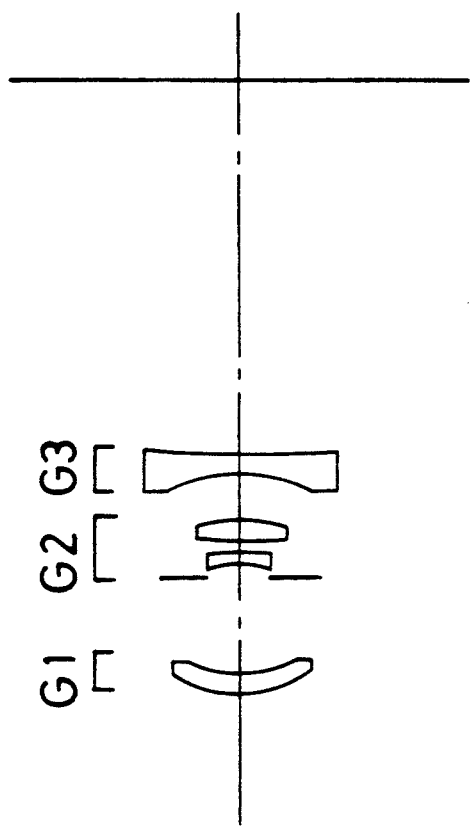
FIG. 1(a)
FIG. 1(b)

COMPACT ZOOM LENS SYSTEM

BACKGROUND OF THE INVENTION

This invention relates to a compact zoom lens system having a zoom ratio of about 1.7 and so lending itself well fit for lens shutter cameras, etc., and more particularly to a zoom lens system comprising three units, say, positive, positive and negative units.

In recent years, zoom lenses smaller in size and lighter in weight have been increasingly demanded to keep pace with lens shutter cameras having a more increased zooming function. A size reduction of zoom lenses for recent lens shutter cameras is tantamount to decreasing mainly the axial length of the lens system (the length from the first surface of the lens system to the film plane). In most cases, this is now achieved by retracting the barrel into the body of a camera when it is kept. However, it is then required to use some barrel-retracting mechanism, which sets limits to the size reduction of a camera body; in other words, the size reduction of a camera should be achieved by reducing the diameters of the lenses or making the optical system short.

So far, some three-unit zoom lenses have been proposed, which comprise a first lens unit having a positive focal length, a second lens unit having a positive focal length and a third lens unit having a negative focal length. Among them, zoom lenses having a zoom ratio of about 1.5 are disclosed in Japanese Provisional Patent Publications Nos. Sho. 60-263113, 61-52620 and 61-109012 and those having a zoom ratio of about 2.0 are set forth in Japanese Provisional Patent Publication No. Hei. 1-93713. These are all made compact in the axial direction while maintaining the power of each unit properly, but they are not in the diametrical direction of the lenses, because the diameter of the image-side lens is increased due to their short back focus. In addition, their short back focus gives rise to a reduction in their distance from the final surface of the lens system to the film plane; flaring is much likely to occur because the light reflected off the image plane is again reflected from the final surface.

SUMMARY OF THE INVENTION

In view of such situations, it is an object of this invention to provide a compact zoom lens system having a zoom ratio of the order of 1.7, which provides a solution to the above problems associated with the prior art, i.e., an increase in the diameter of the image-side lens which is caused by a short back focus and a fair possibility of flaring.

According to this invention, the above object is achieved by providing a compact zoom lens system comprising, in order from the object side, a first lens unit having a positive focal length, a second lens unit having a positive focal length and a third lens unit having a negative focal length, said first, second and third lens units being all movable toward the object side during zooming from the wide angle to telephoto side such that the first and second lens units are spaced away from each other, while the second and third lens units are moved toward each other, characterized in that it satisfies the following conditional formula:

$$0.34 < f_3(1-\beta_{3W})/f_W < 1.00, \qquad (1)$$

and $$0.30 < f_2/f_W < 0.90. \qquad (2)$$

Here $f_W$ is the focal length of the total system at the wide angle end, $\beta_{3W}$ is the image-formation magnification of the third lens unit at the wide angle end, and $f_2$ and $f_3$ are the focal lengths of the second and third lens units, respectively.

In this case, the first and third lens units may be movable together.

More preferably, the following conditional formula should be satisfied:

$$0.40 < L_{23W}/IH < 1.05. \qquad (3)$$

Here $L_{23W}$ is the distance at the wide angle end from the surface of the second lens unit proximate to the object to the surface of the third lens unit proximate to the image plane and IH is the maximum value of an image height.

In one embodiment of the zoom lens system of this invention, the first lens unit may comprise a positive meniscus lens convex on the object side; the second lens unit a stop, a negative meniscus lens concave on the object side and a positive lens; and the third lens unit a negative lens.

In this embodiment, it is further desired that the following conditional formula be satisfied:

$$1.2 < f_1/f_W < 8.0, \qquad (4)$$

and $$\nu_{d1} < 62.8. \qquad (5)$$

Here $f_1$ is the focal length of the first lens unit and $\nu_{d1}$ is the Abbe's number of the lens of the first lens unit.

Another embodiment of this invention is directed to a zoom lens system which includes, in order from the object side, a first lens unit comprising a single positive lens component, a second lens unit comprising one negative lens component and one positive lens component and having a positive refractive power as a whole and a third lens unit comprising a single negative lens component, said lens units being all movable toward the object side along the optical axis during zooming such that the first and second lens units are spaced away from each other while the second and third lens units are moved toward each other, whereby the focal length is varied from the wide angle to telephoto side.

Reference will now be made to what is implied by the above conditions.

Conditional Formula (1) defines the back focus at the wide angle end. Above the upper limit, the image-formation magnification $\beta_{3W}$ of the 3rd unit G3 increases simultaneously with too large a decrease in the composite focal length of the 1st and 2nd units G1 and G2, making compensation of aberrations, esp., coma difficult. Below the lower limit, on the other hand, the back focus becomes too short to make the lens system compact, because there is an increase in the lens diameter on the image side.

Conditional Formula (2) defines the focal length of the second unit G2. Exceeding the upper limit renders compensation of chromatic aberration difficult, whereas falling short of the lower limit makes compensation of various aberrations, esp., spherical aberration difficult.

According to this invention, the 1st and 3rd units G1 and G3 are designed to be movable together during zooming, thereby simplifying the structure of the barrel and making the camera compact.

In order to make the system compact, it is desired to conform to the following conditional formula:

$$0.40 < L_{23W}/IH < 1.05, \qquad (3)$$

where $L_{23W}$ is the distance in wide angle configuration from the surface of the 2nd unit proximate to the object to the surface of the 3rd unit proximate to the image plane and IH is the distance half the diagonal length of the frame (that equals the maximum value of an image height). Above the upper limit of Conditional Formula (3), the total length of the 2nd and 3rd units G2 and G3 becomes too long to make the system compact. Below the lower limit, on the other hand, compensation of aberrations, esp., distortion and coma is rendered difficult.

In view of compensation of aberrations and making the system compact, the zoom lens system of this invention should preferably include, from the object side, a first unit comprising one positive meniscus lens convex on the object side, a second unit comprising, from the object side, a stop and two lenses, say, one negative meniscus lens concave on the object side and one positive lens, and a third unit comprising one negative lens, said second and third units each including one aspherical surface. Thus, the total length of the lens system can be reduced by constructing it with four lenses in all; some extension of the back focus can be compensated for, thereby allowing the lens system to be in a compact form.

When the lens system is constructed with four lenses, it should desirously conform to the following conditional formula:

$$1.2 < f_1/f_W < 8.0, \qquad (4)$$

and $$\nu_{d1} > 62.8. \qquad (5)$$

Here $f_W$ is the focal length of the total system in wide angle configuration, $f_1$ is the focal length of the first unit and $\nu_{d1}$ is the Abbe's number of the first unit with respect to the d-line. Above the upper limit of Conditional Formula (4), difficulty is involved in compensating for various aberrations, esp., coma, whereas below the lower limit, difficulty is experienced in compensating for chromatic aberration. Below the lower limit of conditional Formula (5), on the other hand, difficulty is encountered in compensating for chromatic aberration.

Still other objects and advantages of the invention will in part be obvious and will in part be apparent from the specification.

The present invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 represents lenses in section according to Examples 1 and 3-6, FIG. 1a and 1b being sectional views at the wide angle and telephoto ends.

DESCRIPTION OF THE PREFERRED EMBODIMENTS

Figure 2:
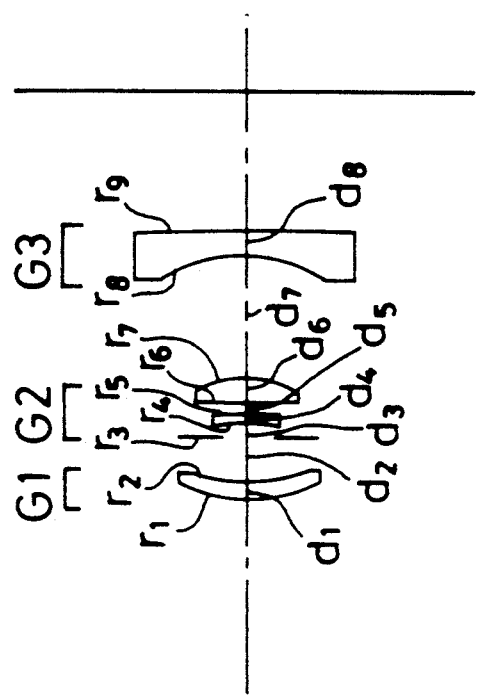
FIG. 2 represents lenses in section according to Example 2, as is the case with FIG. 1, and FIGS. 3-8 inclusive are aberration curves of Examples 1-6, (a), (b) and (c) showing those at the wide angle end, in the standard configuration and at the telephoto end, respectively.
Figure 2:
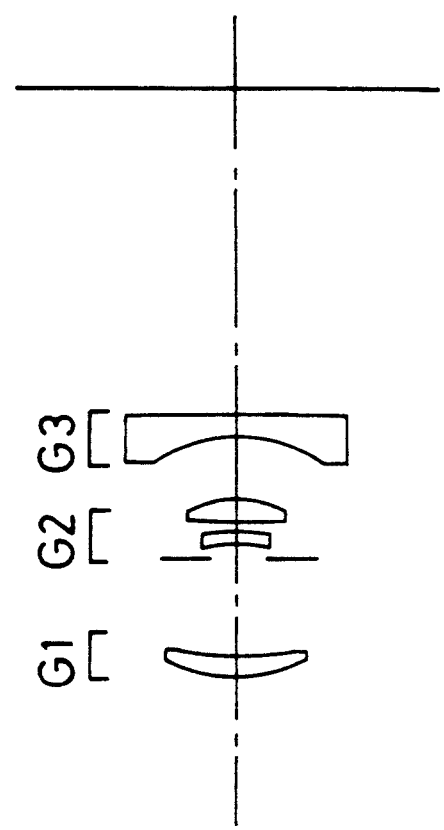
Figure 3:
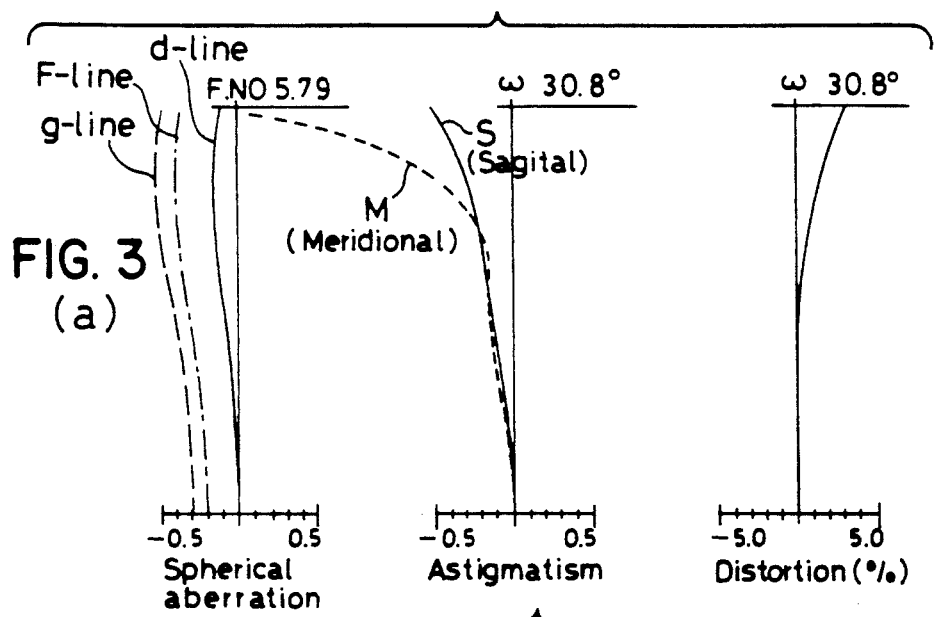
Figure 3:
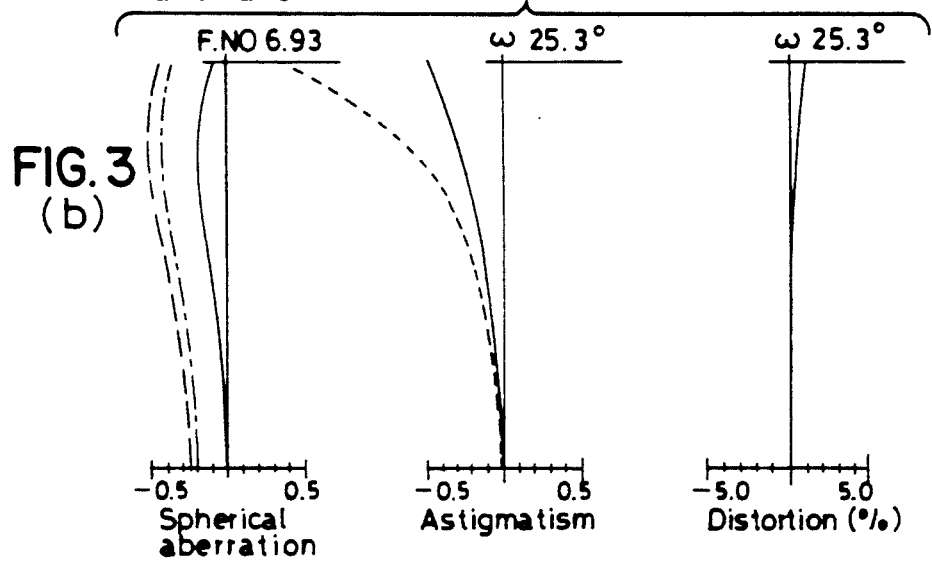
Figure 3:
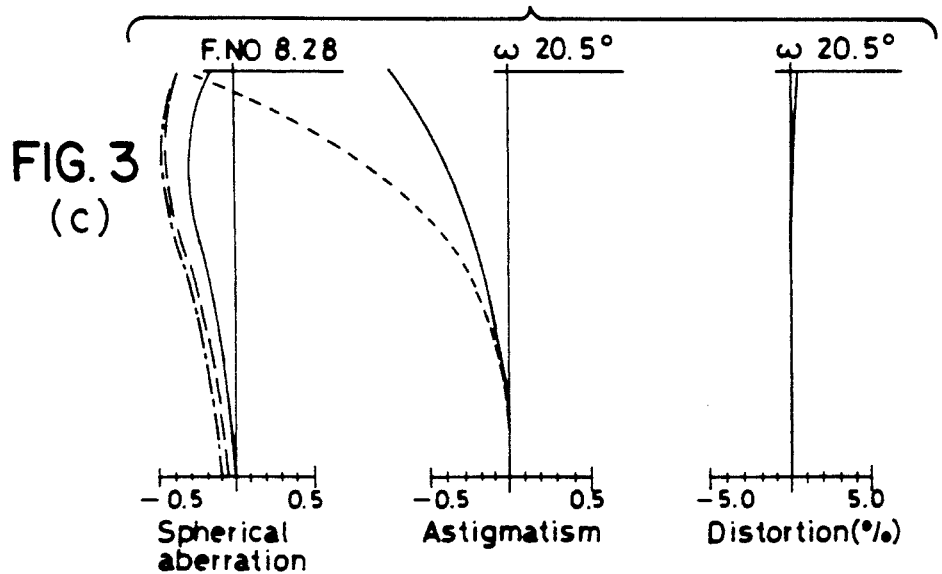
Figure 4A:
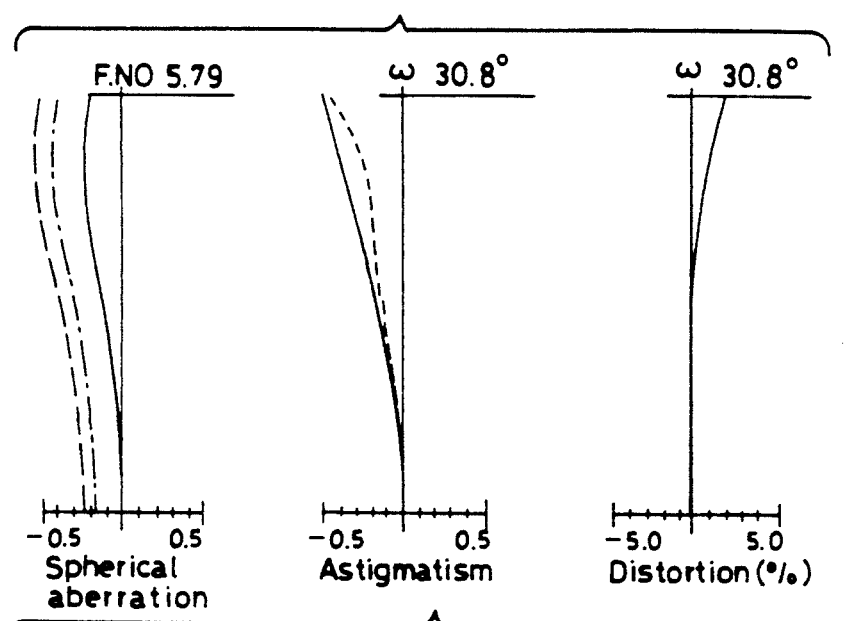
Figure 4B:
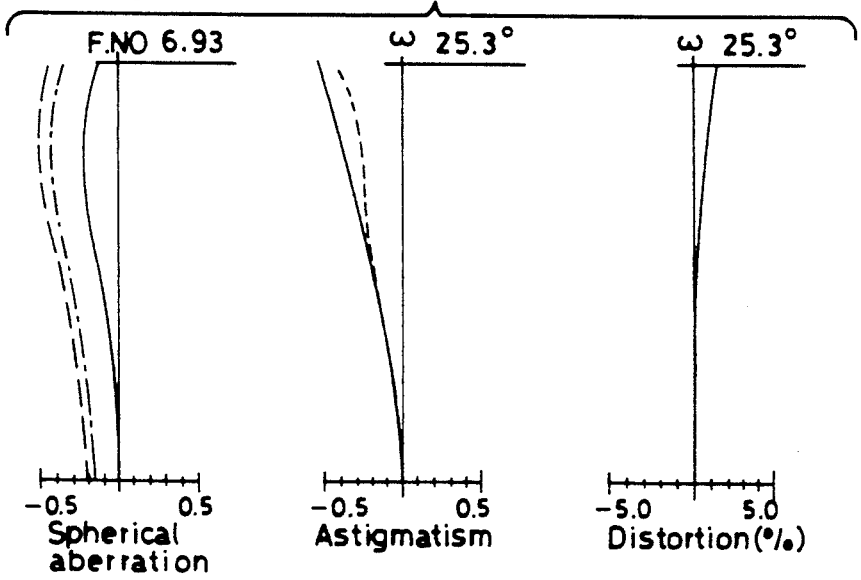
Figure 4C:
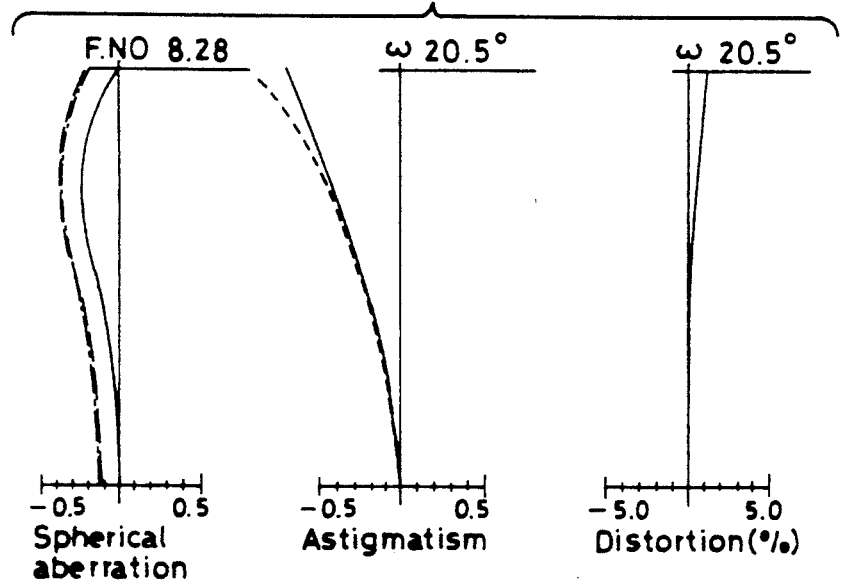
Figure 5A:
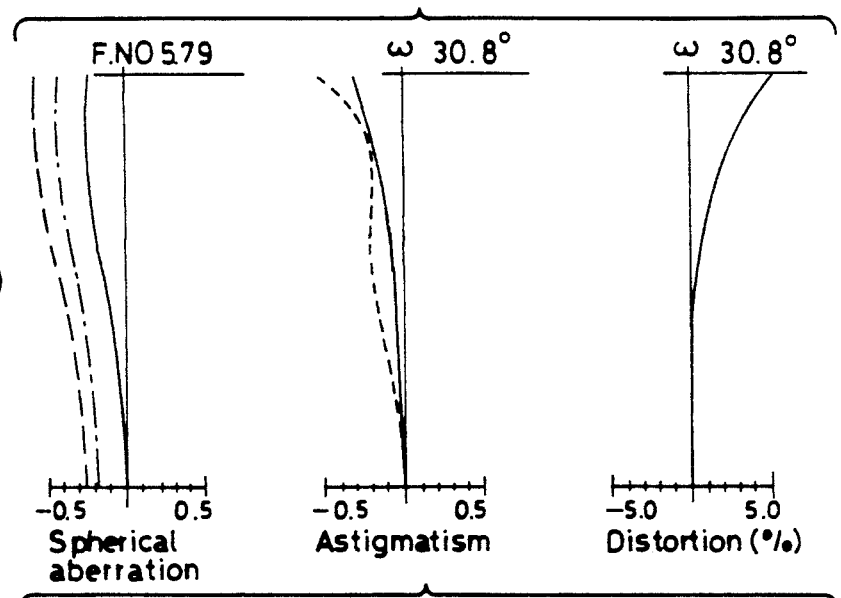
Figure 5B:
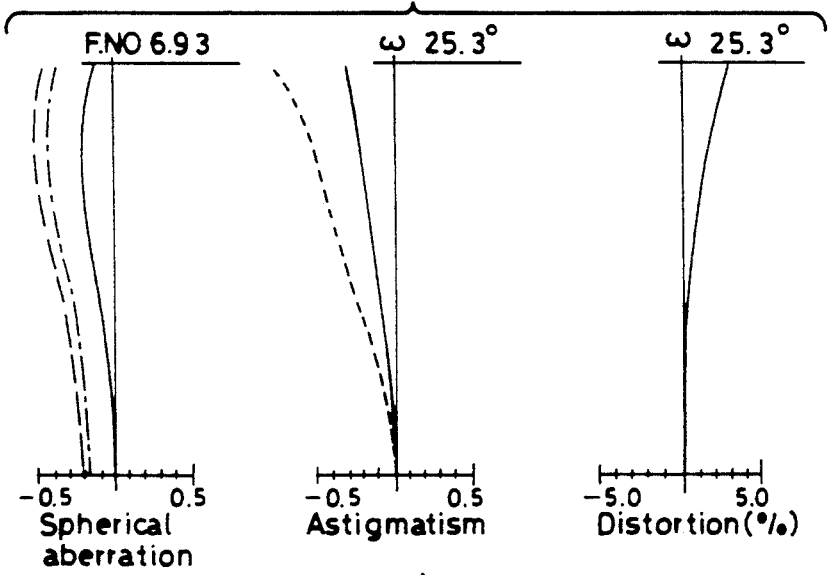
Figure 5C:
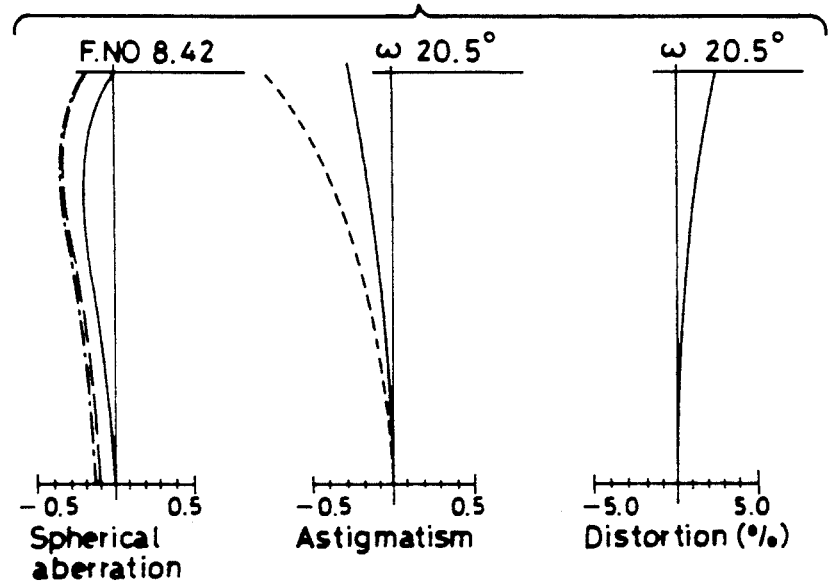
Figure 6A:
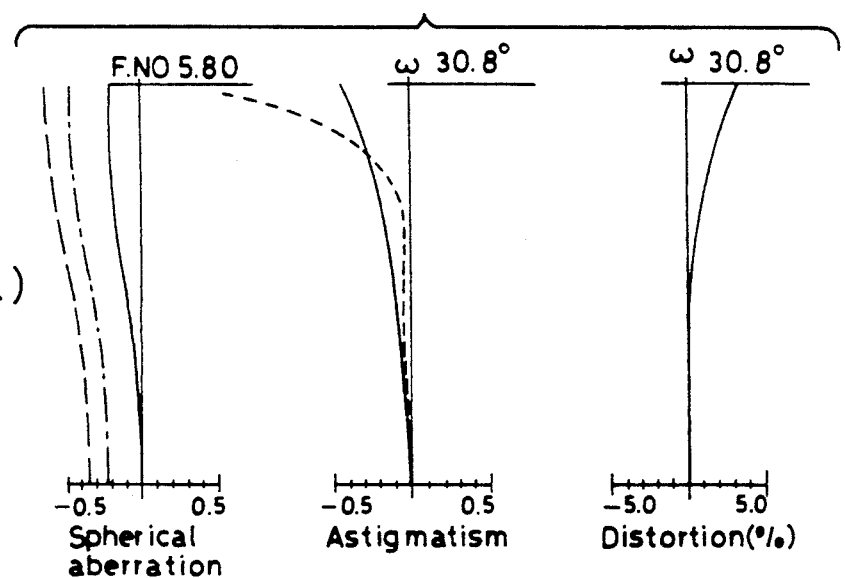
Figure 6B:
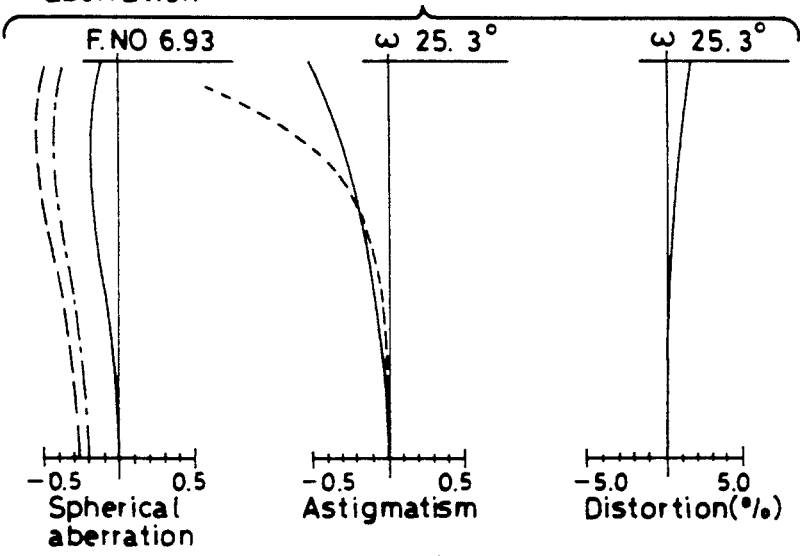
Figure 6C:
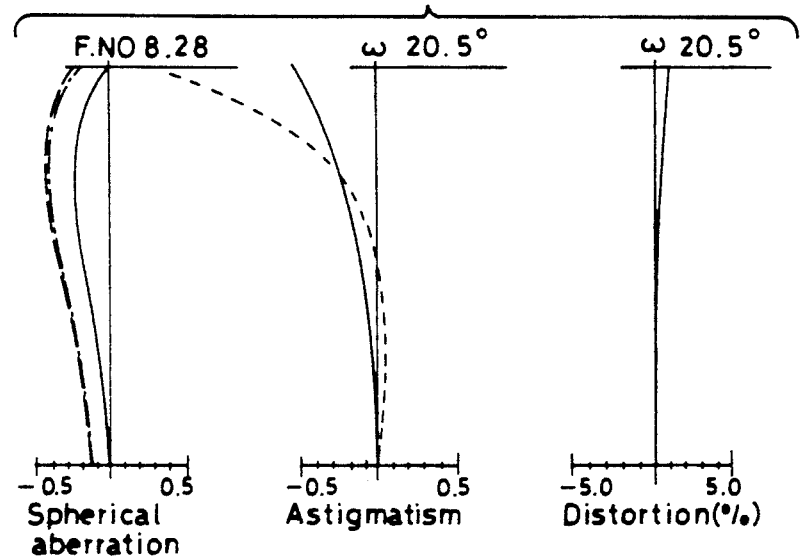
Figure 7A:
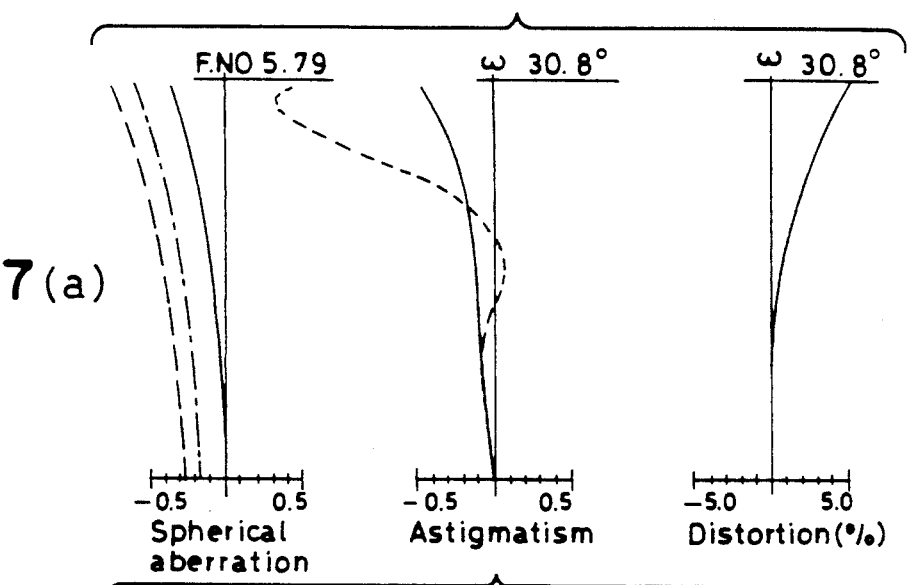
Figure 7B:
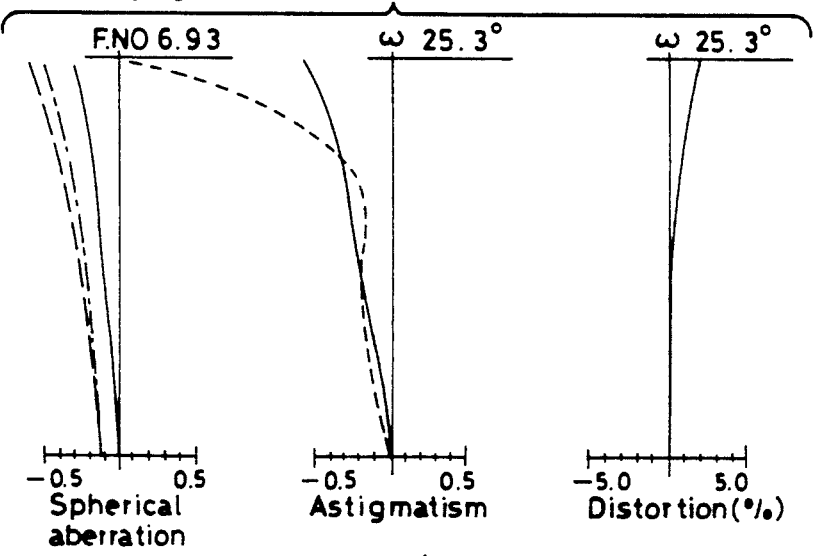
Figure 7C:
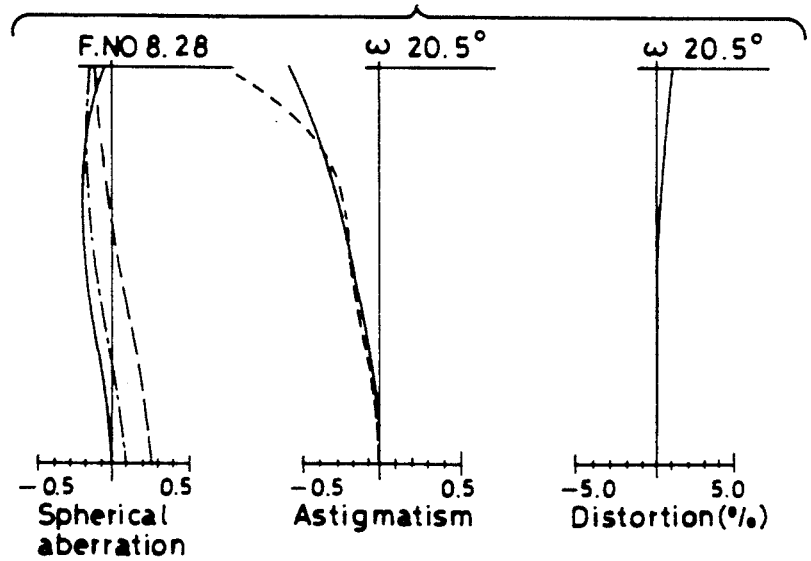
Figure 8A:
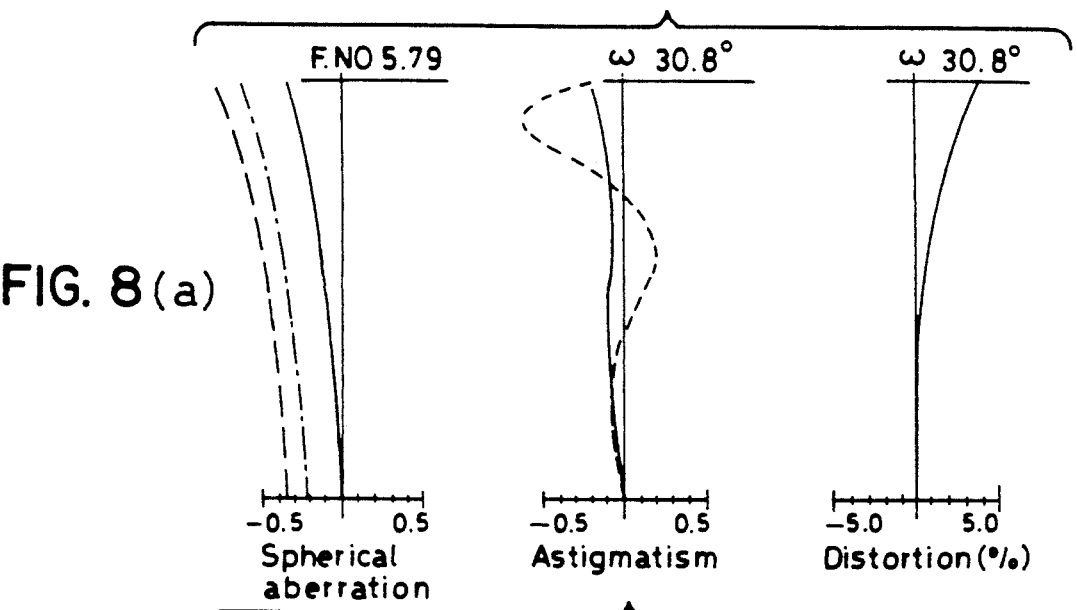
Figure 8B:
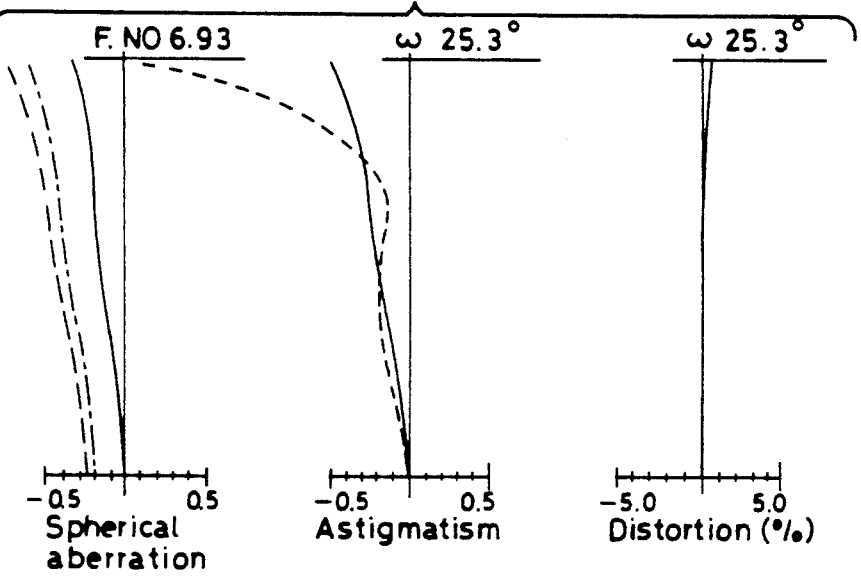
Figure 8C:
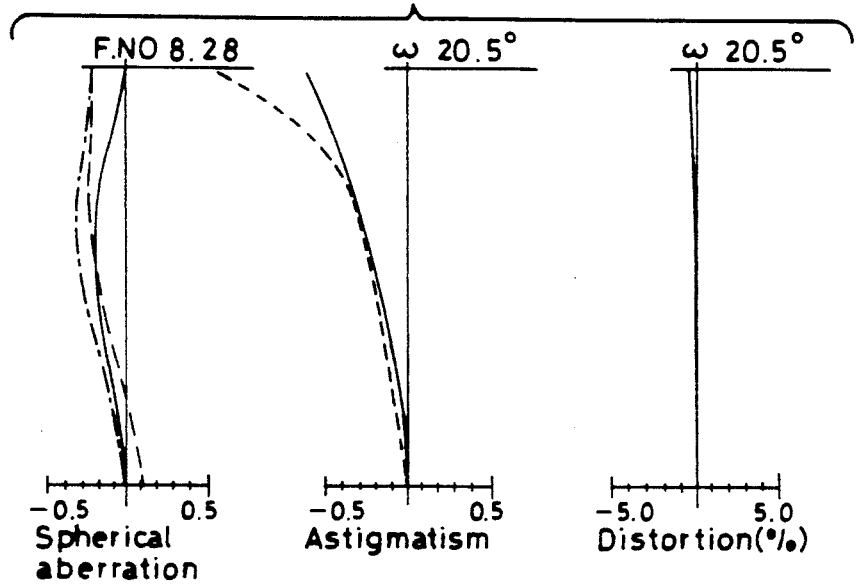

In the ensuing description, Examples 1-6 according to this invention will be explained. Lenses according to Examples 1 and 3-6 at the wide angle (a) and telephoto (b) ends are shown in section in FIG. 1, and lenses according to Example 1 at the wide angle (a) and telephoto (b) ends are shown in section in FIG. 2. Note that the lens data of each example will be given later. In each example, the first unit G1 comprises one positive meniscus lens concave on the object side and the second unit G2 comprises, from the object side, a negative meniscus lens concave on the object side and a positive lens, two in all, as disclosed. A stop is located just before the second unit and movable together with the second unit. The third unit G3 comprises one negative meniscus lens concave on the object side in Example 2 and one double-concave lens in other examples.

Referring to aspheric configuration, two aspherical surfaces are applied to the surface of the second unit proximate to the image plane and to the surface of the third unit proximate to the object side throughout the examples.

Aberration curves of Examples 1-6 (a) at the wide angle end, (b) in the standard configuration and (c) at the telephoto end are shown in FIGS. 3-8.

In the ensuing pages, the lens data of Examples 1-6 will be given. It is noted that reference letters used hereinafter but not hereinbefore are: f is the focal length of the total system, $F_{NO}$ the F-number, $2\Omega$ the field angle, $f_B$ the back focus, r1, r2, ... the radii of curvature of the respective lens surfaces, d1, d2, ... the separations between the respective lens surfaces, $n_{d1}$, $n_{d2}$, ... the refractive indices of the respective lenses with respect to the d-lines, and $\nu_{d1}$, $\nu_{d2}$, ... the Abbe's numbers of the respective lenses. Now let x and y denote the axial direction and the direction normal thereto, respectively. Then, the spherical configuration is represented by $$x = (y^2/r)/[1 + \{1 - P(y^2/r^2)\}^{\frac{1}{2}}] + A_4 y^4 + A_6 y^6 + A_8 y^8 + A_{10} y^{10}.$$

Here r is the paraxial radius of curvature, P is the conical coefficient and $A_4$, $A_6$ and $A_8$ are the aspherical coefficients.

EXAMPLE 1 f = 36.22~45.78~57.89
$F_{NO}$ = 5.79~6.93~8.28
$2\omega$ = 61.62~50.52~40.92°
$f_B$ = 16.13~25.05~36.23

| | | |
|---|---|---|
| r1 = 10.6571 | d1 = 1.986 | $n_{d1}$ = 1.49700 $\nu_{d1}$ = 81.61 |
| r2 = 14.5404 | d2 = (Variable) | |
| r3 = ∞ (Stop) | d3 = 2.011 | |

-continued

| | | |
|---|---|---|
| $r_4 = -8.1675$ | $d_4 = 1.058$ | $n_{d2} = 1.78470 \ \nu_{d2} = 26.30$ |
| $r_5 = -21.7067$ | $d_5 = 0.800$ | |
| $r_6 = 29.3789$ | $d_6 = 2.707$ | $n_{d3} = 1.57309 \ \nu_{d3} = 42.57$ |
| $r_7 = -8.4099$ (Aspheric) | $d_7 =$ (Variable) | |
| $r_8 = -13.2854$ (Aspheric) | $d_8 = 1.712$ | $n_{d4} = 1.49260 \ \nu_{d4} = 58.02$ |
| $r_9 = 100.0794$ | | |

Zooming Spaces

| f | 36.22 | 45.78 | 57.89 |
|---|---|---|---|
| $d_2$ | 3.9163 | 6.4456 | 8.9562 |
| $d_7$ | 9.8664 | 7.1372 | 4.8265 |

Aspherical Coefficients
7th surface
P = 1
$A_4 = 0.27817 \times 10^{-3}$
$A_6 = 0.16008 \times 10^{-5}$
$A_8 = 0.46318 \times 10^{-7}$
$A_{10} = 0.60451 \times 10^{-9}$
8th surface
$A_4 = 0.11693 \times 10^{-3}$
$A_6 = 0.87788 \times 10^{-6}$
$A_8 = 0.83045 \times 10^{-9}$

EXAMPLE 2

$f = 36.22 \sim 45.78 \sim 57.89$
$F_{NO} = 5.79 \sim 6.93 \sim 8.28$
$2\omega = 61.62 \sim 50.52 \sim 40.92°$
$f_B = 13.61 \sim 21.92 \sim 32.29$

| | | |
|---|---|---|
| $r_1 = 12.7195$ | $d_1 = 1.909$ | $n_{d1} = 1.43875 \ \nu_{d1} = 94.97$ |
| $r_2 = 22.8635$ | $d_2 =$ (Variable) | |
| $r_3 = \infty$ (Stop) | $d_3 = 2.011$ | |
| $r_4 = -8.5139$ | $d_4 = 1.058$ | $n_{d2} = 1.78470 \ \nu_{d2} = 26.30$ |
| $r_5 = -20.9242$ | $d_5 = 0.800$ | |
| $r_6 = 45.7467$ | $d_6 = 2.704$ | $n_{d3} = 1.57309 \ \nu_{d3} = 42.57$ |
| $r_7 = -8.7756$ (Aspheric) | $d_7 =$ (Variable) | |
| $r_8 = -13.1353$ (Aspheric) | $d_8 = 1.799$ | $n_{d4} = 1.56873 \ \nu_{d4} = 63.16$ |
| $r_9 = -214.1752$ | | |

Zooming Spaces

| f | 36.22 | 45.78 | 57.90 |
|---|---|---|---|
| $d_2$ | 3.9163 | 7.0330 | 9.7085 |
| $d_7$ | 12.2975 | 9.1808 | 6.5053 |

Aspherical Coefficients
7th surface
P = 1
$A_4 = 0.19078 \times 10^{-3}$
$A_6 = 0.16506 \times 10^{-5}$
$A_8 = 0.46318 \times 10^{-7}$
$A_{10} = 0.60451 \times 10^{-9}$
8th surface
P = 1
$A_4 = 0.74661 \times 10^{-4}$
$A_6 = 0.18561 \times 10^{-6}$
$A_8 = 0.83045 \times 10^{-9}$

EXAMPLE 3

$f = 36.22 \sim 45.78 \sim 57.90$
$F_{NO} = 5.79 \sim 6.93 \sim 8.42$
$2\omega = 61.62 \sim 50.52 \sim 40.92°$
$f_B = 15.378 \sim 22.99 \sim 32.55$

| | | |
|---|---|---|
| $r_1 = 11.6088$ | $d_1 = 1.909$ | $n_{d1} = 1.43875 \ \nu_{d1} = 94.97$ |
| $r_2 = 22.5370$ | $d_2 =$ (Variable) | |
| $r_3 = \infty$ (Stop) | $d_3 = 2.011$ | |
| $r_4 = -8.2726$ | $d_4 = 1.058$ | $n_{d2} = 1.78470 \ \nu_{d2} = 26.30$ |
| $r_5 = -24.3566$ | $d_5 = 0.800$ | |
| $r_6 = 31.1133$ | $d_6 = 2.705$ | $n_{d3} = 1.57309 \ \nu_{d3} = 42.57$ |
| $r_7 = -7.7297$ (Aspheric) | $d_7 =$ (Variable) | |
| $r_8 = -10.8385$ (Aspheric) | $d_8 = 1.799$ | $n_{d4} = 1.56873 \ \nu_{d4} = 63.16$ |
| $r_9 = 169.4029$ | | |

Zooming Spaces

| f | 36.22 | 45.78 | 57.90 |
|---|---|---|---|

-continued

|  |  |  |  |
|---|---|---|---|
| $d_2$ | 3.9163 | 5.8713 | 7.5235 |
| $d_7$ | 8.7654 | 6.8104 | 5.1581 |

Aspherical Coefficients
7th surface
P = 1
$A_4 = 0.35384 \times 10^{-3}$
$A_6 = 0.25257 \times 10^{-5}$
$A_8 = 0.46318 \times 10^{-7}$
$A_{10} = 0.60451 \times 10^{-9}$
8th surface
P = 1
$A_4 = 0.19951 \times 10^{-3}$
$A_6 = 0.82385 \times 10^{-6}$
$A_8 = 0.83045 \times 10^{-9}$

EXAMPLE 4

$f = 36.22 \sim 45.78 \sim 57.91$
$F_{NO} = 5.80 \sim 6.93 \sim 8.28$
$2\omega = 61.61 \sim 50.51 \sim 40.91°$
$f_B = 18.31 \sim 26.56 \sim 36.93$

| | | |
|---|---|---|
| $r_1 = 9.4100$ | $d_1 = 1.909$ | $n_{d1} = 1.43875 \; \nu_{d1} = 94.97$ |
| $r_2 = 15.1210$ | $d_2 = $ (Variable) | |
| $r_3 = \infty$ (Stop) | $d_3 = 2.011$ | |
| $r_4 = -8.3204$ | $d_4 = 1.058$ | $n_{d2} = 1.78470 \; \nu_{d2} = 26.30$ |
| $r_5 = -24.1590$ | $d_5 = 0.670$ | |
| $r_6 = 23.0131$ | $d_6 = 2.690$ | $n_{d3} = 1.57309 \; \nu_{d3} = 42.57$ |
| $r_7 = -7.5850$ (Aspheric) | $d_7 = $ (Variable) | |
| $r_8 = -9.6181$ (Aspheric) | $d_8 = 1.739$ | $n_{d4} = 1.51633 \; \nu_{d4} = 64.15$ |
| $r_9 = 111.1176$ | | |

Zooming Spaces

| f | 36.22 | 45.78 | 57.91 |
|---|---|---|---|
| $d_2$ | 3.9163 | 5.5770 | 6.9698 |
| $d_7$ | 5.9849 | 4.3242 | 2.9314 |

Aspherical Coefficients
7th surface
P = 1
$A_4 = 0.46750 \times 10^{-3}$
$A_6 = 0.22570 \times 10^{-5}$
$A_8 = 0.46318 \times 10^{-7}$
$A_{10} = 0.60451 \times 10^{-9}$
8th surface
P = 1
$A_4 = 0.28202 \times 10^{-3}$
$A_6 = 0.18676 \times 10^{-5}$
$A_8 = 0.23782 \times 10^{-8}$

EXAMPLE 5

$f = 36.18 \sim 36.22 \sim 45.80 \sim 57.90$
$F_{NO} = 5.78 \sim 6.93 \sim 8.28$
$2\omega = 61.68 \sim 50.50 \sim 40.92°$
$f_B = 20.59 \sim 30.93 \sim 43.92$

| | | |
|---|---|---|
| $r_1 = 9.4616$ | $d_1 = 3.602$ | $n_{d1} = 1.43875 \; \nu_{d1} = 94.97$ |
| $r_2 = 9.6095$ | $d_2 = $ (Variable) | |
| $r_3 = \infty$ (Stop) | $d_3 = 2.011$ | |
| $r_4 = -6.1952$ | $d_4 = 1.058$ | $n_{d2} = 1.78470 \; \nu_{d2} = 26.30$ |
| $r_5 = -9.1103$ | $d_5 = 0.908$ | |
| $r_6 = 24.1212$ | $d_6 = 2.760$ | $n_{d3} = 1.49260 \; \nu_{d3} = 58.02$ |
| $r_7 = -7.5897$ (Aspheric) | $d_7 = $ (Variable) | |
| $r_8 = -15.0885$ (Aspheric) | $d_8 = 1.712$ | $n_{d4} = 1.49260 \; \nu_{d4} = 58.02$ |
| $r_9 = 30.6442$ | | |

Zooming Spaces

| f | 36.22 | 45.80 | 57.90 |
|---|---|---|---|
| $d_2$ | 3.9163 | 5.9072 | 7.5102 |
| $d_7$ | 5.6871 | 3.6962 | 2.0932 |

Aspherical Coefficients
7th surface
P = 1.1233
$A_4 = 0.42060 \times 10^{-3}$

-continued $A_6 = 0.38750 \times 10^{-5}$
$A_8 = -0.16984 \times 10^{-6}$
$A_{10} = 0.73604 \times 10^{-8}$
8th surface
P = 4.0304
$A_4 = 0.26458 \times 10^{-3}$
$A_6 = 0.29259 \times 10^{-5}$
$A_8 = 0.78774 \times 10^{-7}$
$A_{10} = -0.35482 \times 10^{-9}$

EXAMPLE 6

$f = 36.18 \sim 45.80 \sim 45.78 \sim 57.90$
$F_{NO} = 5.79 \sim 6.93 \sim 8.28$
$2\omega = 61.68 \sim 50.50 \sim 40.92°$
$f_B = 20.99 \sim 32.82 \sim 47.69$ $r_1 = 10.1786$         $d_1 = 3.875$        $n_{d1} = 1.54771 \; \nu_{d1} = 62.83$
$r_2 = 9.5139$          $d_2 = $ (Variable)
$r_3 = \infty$ (Stop)   $d_3 = 2.011$
$r_4 = -6.6277$         $d_4 = 1.058$        $n_{d2} = 1.78470 \; \nu_{d2} = 26.30$
$r_5 = -10.3059$        $d_5 = 1.000$
$r_6 = 31.3906$         $d_6 = 2.760$        $n_{d3} = 1.56883 \; \nu_{d3} = 56.34$
$r_7 = -8.7333$ (Aspheric)  $d_7 = $ (Variable)
$r_8 = -24.1341$ (Aspheric) $d_8 = 1.799$    $n_{d4} = 1.56873 \; \nu_{d4} = 63.16$
$r_9 = 37.8565$

| | Zooming Spaces | | |
|---|---|---|---|
| f | 36.22 | 45.80 | 57.90 |
| $d_2$ | 3.9163 | 6.7130 | 8.9598 |
| $d_7$ | 6.3165 | 3.5198 | 1.2703 |

Aspherical Coefficients
7th surface
P = 0.9841
$A_4 = 0.22375 \times 10^{-3}$
$A_6 = 0.33182 \times 10^{-5}$
$A_8 = 0.20903 \times 10^{-6}$
$A_{10} = 0.58505 \times 10^{-8}$
8th surface
P = 1.5619
$A_4 = 0.63520 \times 10^{-4}$
$A_6 = 0.22259 \times 10^{-5}$
$A_8 = 0.38320 \times 10^{-7}$
$A_{10} = -0.43135 \times 10^{-9}$ Set out below are the value corresponding to the conditions (1) to (5) in Examples 1-6.

| | Ex. 1 | Ex. 2 | Ex. 3 | Ex. 4 | Ex. 5 | Ex. 6 |
|---|---|---|---|---|---|---|
| $f_3(1-\beta_{3W})/f_W$ | 0.473 | 0.410 | 0.454 | 0.534 | 0.594 | 0.599 |
| $f_2 f_W$ | 0.641 | 0.744 | 0.592 | 0.508 | 0.448 | 0.483 |
| $L_{23W}/IH$ | 0.84 | 0.96 | 0.79 | 0.65 | 0.65 | 0.69 |
| $f_1 f_W$ | 1.895 | 1.706 | 1.430 | 1.423 | 4.352 | 6.917 |
| $\nu_{d1}$ | 81.61 | 94.97 | 94.97 | 94.97 | 62.83 | |

As set forth above and as can be seen from the examples and the corresponding sectional views, the compact zoom lens system of this invention can be made compact in the lenses' diametrical direction. By extending the back focus, this zoom lens system allows the barrel of an optical system to be easily retracted into the body of a camera when it is kept and can be made compact in the axial direction as well. Thus, the present zoom lens is well suited for a compact camera.

What we claim is:

1. A compact zoom lens system comprising, in order from the object side, a first lens unit having a positive focal length, a second lens unit having a positive focal length and a third lens unit having a negative focal length, said first, second and third lens units being all movable toward the object side during zooming from the wide angle to telephoto side such that the first and second lens units are spaced away from each other, while the second and third lens units are moved toward each other, characterized in that it satisfies the following conditional formula:

$$0.34 < f_3(1-\beta_{3W})/f_W < 1.00, \quad (1)$$

and $$0.30 < f_2/f_W < 0.90, \quad (2)$$

where $f_W$ is the focal length of the total system at the wide angle end, $\beta_{3W}$ is the image-formation magnification of the third lens unit at the wide angle end, and $f_2$ and $f_3$ are the focal lengths of the second and third lens units, respectively.

2. A compact zoom lens system as claimed in claim 1, characterized in that said first and third lens units are movable together.

3. A compact zoom lens system as claimed in claim 1, characterized by satisfying the following conditional formula:

$$0.40 < L_{23W}/IH < 1.05, \quad (3)$$

where $L_{23W}$ is the distance at the wide angle end from the surface of the second lens unit proximate to the object to the surface of the third lens unit proximate to the image plane and IH is the maximum value of an image height.

4. A compact zoom lens system as claimed in claim 1, characterized in that the first lens unit comprises a positive meniscus lens convex on the object side, the second lens unit comprises a stop, a negative meniscus lens concave on the object side and a positive lens, and the third lens unit comprises a negative lens.

5. A compact zoom lens system as claimed in claim 1, further characterized by satisfying the following conditional formula:

$$1.2 < f_1/f_W < 8.0, \quad (4)$$

and $$\nu_{d1} > 62.8, \quad (5)$$

where $f_1$ is the focal length of the first lens unit and $\nu_{d1}$ is the Abbe's number of the lens of the first lens unit.

6. A zoom lens system including, in order from the object side,
- a first lens unit being a single positive lens element,
- a second lens unit comprising one negative lens element and one positive lens element air-spaced from one another, and having a positive refractive power as a whole, and
- a third lens unit comprising a single negative lens component,
- said lens units being all movable toward the object side along the optical axis during zooming such that the first and second lens units are spaced away from each other, while the second and third lens units are moved toward each other, whereby the focal length is varied from the wide angle to the telephone side.

7. A zoom lens system as claimed in claim 6, wherein the second lens unit includes an aspherical surface.

8. A zoom lens system as claimed in claim 6, wherein the third lens unit includes an aspherical surface.

9. A zoom lens system as claimed in claim 7, wherein the third lens unit includes an aspherical surface.

10. A zoom lens system including, in order from the object side,
- a first lens unit including a single positive lens element,
- a second lens unit consisting of air-spaced negative and positive lens elements, and having a positive refractive power as a whole, and
- a third lens unit including a single negative lens element,
- said lens units being all movable toward the object side along the optical axis during zooming such that the first and second lens units are spaced away from each other, while the second and third lens units are moved toward each other, whereby the focal length is varied from the wide angle to the telephoto side.

11. A zoom lens system as claimed in claim 10, wherein the second lens unit includes an aspherical surface.

12. A zoom lens system as claimed in claim 10, wherein the third lens unit includes an aspherical surface.

13. A zoom lens system as claimed in claim 11, wherein the third lens unit includes an aspherical surface.

14. A zoom lens system including, in order from the object side,
- a first lens unit being a single positive lens element,
- a second lens unit consisting of air-spaced negative and positive lens elements, and having a positive refractive power as a whole, and
- a third lens unit including a single negative lens element,
- said lens units being all movable toward the object side along the optical axis during zooming such that the first and second lens units are spaced away from each other, while the second and third lens units are moved toward each other, whereby the focal length is varied from the wide angle to the telephoto side.

15. A zoom lens system as claimed in claim 14, wherein the second lens unit includes an aspherical surface.

16. A zoom lens system as claimed in claim 14, wherein the third lens unit includes an aspherical surface.

17. A zoom lens system as claimed in claim 15, wherein the third lens unit includes an aspherical surface.

18. A zoom lens system including no more than four lens elements in all, and including, in order from the object side,
- a first lens unit formed of a single positive lens element,
- a second lens unit consisting of one negative lens element and one positive lens element being air-spaced from one another, and having a positive refractive power as a whole, and
- a third lens unit including a single negative lens element,
- said lens units being all movable toward the object side along the optical axis during zooming such that the first and second lens units are spaced away from each other, while the second and third lens units are moved toward each other, whereby the focal length is varied from the wide angle to the telephoto side.

19. A zoom lens system as claimed in claim 18, wherein the second lens unit includes an aspherical surface.

20. A zoom lens system as claimed in claim 18, wherein the third lens unit includes an aspherical surface.

21. A zoom lens system as claimed in claim 19, wherein the third lens unit includes an aspherical surface.

* * * * *